US008660360B1

United States Patent
Robinson et al.

(10) Patent No.: US 8,660,360 B1
(45) Date of Patent: Feb. 25, 2014

(54) SYSTEM AND METHOD FOR REDUCED INCREMENTAL SPECTRAL CLUSTERING

(75) Inventors: Ian S. Robinson, Redondo Beach, CA (US); Bradley A. Flanders, Whittier, CA (US)

(73) Assignee: Raytheon Company, Waltham, MA (US)

( * ) Notice: Subject to any disclaimer, the term of this patent is extended or adjusted under 35 U.S.C. 154(b) by 5 days.

(21) Appl. No.: 13/566,914

(22) Filed: Aug. 3, 2012

(51) Int. Cl.
*G06K 9/46* (2006.01)
*G06K 9/62* (2006.01)
*G06K 9/66* (2006.01)

(52) U.S. Cl.
USPC .......................................... 382/191; 382/255

(58) Field of Classification Search
USPC ................. 382/170, 180, 181, 191, 224–225, 382/253–254, 274, 276, 284, 298
See application file for complete search history.

(56) References Cited

U.S. PATENT DOCUMENTS

| | | | |
|---|---|---|---|
| 6,075,891 A | 6/2000 | Burman | |
| 6,208,752 B1 * | 3/2001 | Palmadesso et al. | 382/155 |
| 6,282,301 B1 | 8/2001 | Haskett | |
| 6,356,646 B1 | 3/2002 | Spencer | |
| 6,504,943 B1 | 1/2003 | Sweatt et al. | |
| 6,546,146 B1 * | 4/2003 | Hollinger et al. | 382/253 |
| 6,665,438 B1 * | 12/2003 | Lin | 382/191 |
| 6,701,021 B1 | 3/2004 | Qian et al. | |
| 6,750,964 B2 | 6/2004 | Levenson et al. | |
| 6,763,136 B1 | 7/2004 | Sweet | |
| 6,778,702 B1 | 8/2004 | Sweet | |
| 6,782,138 B1 | 8/2004 | Leisner et al. | |
| 6,804,400 B1 | 10/2004 | Sharp | |
| 6,859,275 B2 | 2/2005 | Fateley et al. | |
| 6,940,999 B2 | 9/2005 | Lin | |
| 6,952,499 B1 | 10/2005 | Vititoe | |
| 7,035,431 B2 | 4/2006 | Blake et al. | |
| 7,180,588 B2 | 2/2007 | Geshwind et al. | |
| 7,194,111 B1 | 3/2007 | Schaum et al. | |
| 7,251,376 B2 | 7/2007 | Qian et al. | |
| 7,356,201 B2 | 4/2008 | Gunther et al. | |

(Continued)

FOREIGN PATENT DOCUMENTS

CN 101763445 A 6/2010

OTHER PUBLICATIONS

Manolakis et al., "Is There a Best Hyperspectral Detection Algorithm?", SPIE—Newsroom; pp. 1-3 (2209) 1994.

(Continued)

*Primary Examiner* — Amir Alavi
(74) *Attorney, Agent, or Firm* — Pierce Atwood LLP; Joseph M. Maraia

(57) ABSTRACT

A method of clustering and reducing hyperspectral image data having a plurality of spatial pixels, and a plurality of spectral dimensions associated with each spatial pixel, includes computing an initial basis vector associated with the hyperspectral image data, unmixing the initial basis vector with the hyperspectral image data to generate an initial set of coefficients and an associated set of residual vectors, generating a set of clusters based on the initial set of coefficients, and iteratively computing one or more additional basis vectors and updating the set of clusters. The iterative computing includes calculating a subsequent basis vector based on a residual vector associated with a prior unmixing, unmixing the subsequent basis vector with a prior set of residual vectors to generate additional coefficients associated with each pixel, and iteratively computing cluster centers and content including an additional dimension associated with the subsequent basis vector.

26 Claims, 8 Drawing Sheets

(56) References Cited

U.S. PATENT DOCUMENTS

| | | | |
|---|---|---|---|
| 7,463,778 | B2 | 12/2008 | Damera-Venkata |
| 7,486,734 | B2 | 2/2009 | Machida |
| 7,551,785 | B2 | 6/2009 | Qian et al. |
| 7,680,337 | B2 | 3/2010 | Gruninger et al. |
| 7,773,828 | B2 | 8/2010 | Sakata et al. |
| 7,961,957 | B2 * | 6/2011 | Schclar et al. ............... 382/225 |
| 8,078,009 | B2 | 12/2011 | Riley et al. |
| 8,150,195 | B2 | 4/2012 | Demirci et al. |
| 8,165,344 | B2 | 4/2012 | Shirasaka |
| 8,175,393 | B2 | 5/2012 | Robinson et al. |
| 8,203,114 | B2 * | 6/2012 | Robinson et al. ............ 250/226 |
| 8,315,472 | B2 * | 11/2012 | Robinson et al. ............ 382/254 |
| 8,391,961 | B2 | 3/2013 | Levenson et al. |
| 8,478,061 | B2 * | 7/2013 | Robinson et al. ............ 382/254 |
| 8,515,179 | B1 * | 8/2013 | Robinson et al. ............ 382/191 |
| 8,538,195 | B2 * | 9/2013 | Robinson ..................... 382/276 |
| 2003/0012398 | A1 | 1/2003 | Sunshine et al. |
| 2004/0218172 | A1 | 11/2004 | DeVerse et al. |
| 2005/0047663 | A1 | 3/2005 | Keenan et al. |
| 2006/0247514 | A1 | 11/2006 | Panasyuk et al. |
| 2009/0074297 | A1 | 3/2009 | Robinson |
| 2010/0303371 | A1 | 12/2010 | Robinson et al. |
| 2012/0224782 | A1 | 9/2012 | Robinson et al. |
| 2012/0263382 | A1 * | 10/2012 | Robinson et al. ............ 382/191 |
| 2013/0039580 | A1 * | 2/2013 | Robles-Kelly et al. ....... 382/191 |
| 2013/0129256 | A1 * | 5/2013 | Robinson et al. ............ 382/298 |
| 2013/0223752 | A1 * | 8/2013 | Robinson et al. ............ 382/244 |

OTHER PUBLICATIONS

Boardman, J., et al., Mapping Target Signatures VIA Partial Unmixing of Aviris Data, Citeseer 1995.

Kuybeda, O., et al., Global Unsupervised Anomaly Extraction and Discrimination in Hyperspectral Images via Maximum Orthogonal-Complements Analysis, Feb. 2008, Department of Electrical Engineering Technion IIT, Haifa 32000, Israel, Retrieved from Internet<URL: http://webee.technion.ac.il/uploads/file/publication/684.pdf.

Sun, L, et al., "Improved Iterative Error Analysis for Endmember Extraction from Hyperspectral Imagery", SPIE Imaging Spectrometry XIII, vol. 708, pp. 400-407, Intro., Sec 2.2-pp. 3-5 (Aug. 2008).

Veganzones, M.A., et al., "Endmember Extraction Methods: A Short Review", pp. 400-407 (Sep. 2008).

Duran, O., et al., "A Time-Efficient Method for Anomaly Detection in Hyperspectral Images", IEEE Transactions on Geoscience and Remote Sensing, IEEE Service Ctr., NJ, US, vol. 45, No. 12, pp. 3894-3904 (Dec. 2007).

Plaza, A., et al., "Spatial/Spectral Endmember Extraction by Multidimensional Morphological Operations", IEEE Transactions on Geoscience and Remote Sensing, IEEE Service Ctr., NJ, US, vol. 40, No. 9, pp. 2025-2029 (Sep. 2002).

Plaza, A., et al., " A New Approach to Mixed Pixel Classification of Hyperspectral imagery based on extended Morphological profiles", Pattern Recognition, Elsevier, vol. 37, No. 6, pp. 1097-1116 (Jun. 2004).

Rogge, D.M., et al., "Integration of Spatial-Spectral Information for the Improved Extraction of Endmembers", Remote Sensing of Environment, Elsevier, vol. 110, No. 3, pp. 287-303 (Aug. 2007).

Filippi, A.M., et al., "Support Vector Machine-Based Endmember Extraction", IEEE Transactions on Geoscience and Remote Sensing, IEEE Service Ctr., NJ, US, vol. 47, No. 3, pp. 771-791 (Mar. 2009).

Keshava, N., et al., "Sprectral Unmixing", IEEE Signal Processing Magazine, vol. 19, No. 1, pp. 44-57, Jan. 1, 2002, XP011093745.

Rogge, D. M., et al., "Iterative Spectral Unmixing for Optimizing Per-Pixel Endmemeber Sets", IEEE Transactions on Geoscience and Remote Sensing, IEE Service Center, vol. 4, No. 12, pp. 3725-3736 (Dec. 2006).

Plaza, Antonio, et al., "A Quantitive and Comparative Analysis of Endmemeber Extraction Algorithms From Hyperspectral Data", IEEE 2004.

Robinson, I., et al. "Comparison of Hyperspectral Sub-Pixel Detection with and Without a Prior Knowledge of Target Features", Aerospace Conference, 1998 IEEE Snowmass at Aspen, Colorado, Mar. 21-28, 1998, vol. 5, pp. 183-189, Mar. 21, 1998, XP010287059, ISBN 978-0-7803-4311-5.

Winter, Michael, "Comparison of Approaches for Determining Endmembers in Hyperspectral Data", IEEE 2000.

Winter, Michael, "N-FINDR: An Algorithm for Fast Autonomous Spectral End-member Determination in Hyperspectral Data", SPIE 1999.

Ulug Bayazit, "Region Adaptive Spectral Transformation for Wavelet Based Color Image Compression", Image Processing (CIP), 2009 16th IEEE International Conference ON, IEEE, Piscataway, NJ, Nov. 7, 2009, pp. 2817-2820, Section 2 and 3.

Dohyun Ahn et al., "Rate-Distortion Optimized Image Compression Using Generalized Principal Component Analysis", Acoustics, Speech and Signal Processing , 2006. ICASSP 2006 Proceedings, 2006 IEEE International Conference on Toulouse, France 14-19, May 14, 2006, pp. 5-8.

Memarsadeghi, N et al., "A Fast Implementation of the Isodata Clustering Algorithm", IJCGA, vol. 17, No. 1, pp. 71-103 (2007).

Wei, C-P, et al., "Empirical Comparison of Fast Clustering Algorithms for Large Data Sets", Proceedings of the 33rd Hawaii Int'l Conf. on System Sciences, pp. 1-10 (2000).

Yan, D, et al., "Fast Approximate Spectral Clustering", KDD'09, (9 pages) Jun. 28-Jul. 1, 2009, Paris, France.

International Preliminary Report on Patentability dated Aug. 29, 2011 of PCT/US2010/024192 filed Feb. 12, 2010 (21 pages).

Meza et al., "Applied Non-Uniformity Correction Algorithm for Striping Noise Removal in Hyperspectral Images", [Downloaded from the Internet: http://nuc.die.udec.cl/publications/papers/2010-NUCStrippingNoise.pdf on Nov. 20, 2012].

Jiang, Ming-Fei, et al., "A Robust estimation of Virtual Dimensionality in Hyperspectral Imagery," Computational Problem-Solving (ICCP), 2010 International Conference on, vol., no., pp. 374-378, Dec. 3-5, 2010.

Harsanyi, Joseph C., et al., "Hyperspectral Image Classification and Dimensionality Reduction: An Orthogonal Subspace Projection Approach," ZEEE Tmns. On Geoscience and Remote Sensing, 32(4), Jul. 1994.

Neville, R.A., et al., "Automatic Endmember Extraction from Hyperspectral Data for Mineral Exploration", 4th Int. Airborne remote Sensing Conf. Exhibition/21st Canadian Symposium on Remote Sensing, pp. 891-896 1999.

Orthogonality and Least Squares, http://www.aerostudents.com/files/linearAlgebra/orthogonalityLeast Squares.pdf, Jul. 2009.

Marco F. Durarte et al., "Structured Compressed Sensing: From Theory to Applications" IEEE Transactions on Signal Processing, IEEE Service Center, New York, vol. 59, No. 9, Sep. 1, 2011, pages.

Pickering M R et al., "Compression of Hyperspectral Data Using Vector Quantisation and the Discrete Cosine Transform", Image Processing, 2000, Proceedings. 2000 International Conference of Sep. 10-13, 2000, IEEE, Piscataway, NJ, Sep. 10, 2000, pp. 195-198, vol. 2.

International Search Report dated Apr. 27, 2011 of PCT/US2010/024192 filed Feb. 12, 2010 (18 pages).

International Search Report dated Feb. 9, 2009 of PCT/US2008/083738.

Manolakis et al., "Hyperspectral Image Processing for Automatic Target Detection Applications,", http://www.cis.rit.edu/-cnspci/references/dip/manolakis2003.pdf, 2003.

Leathers et al., "Scene-based Nonuniformity Corrections for Optical and SWIR Pushbroom Sensors", Optics Express; 13(13): 5136-5150 (Jun. 27, 2005).

Chein-I Chang Ed-Chein-I Chang: "An Optical Real-time adaptive spectral identification system (ORASIS)", Hyperspectral Data Exploitation: Theory and Applications, Wiley, Hoboken, NJ, pp. 77-106, 2007.

Ding et al., "Adaptive dimension reduction for clustering high dimensional data," Data Mining 2002. Proceedings of 2002 IEEE International Conference on Maebashi City Japan, 2002.

* cited by examiner

SYSTEM AND METHOD FOR REDUCED INCREMENTAL SPECTRAL CLUSTERING

CROSS-REFERENCE TO RELATED APPLICATIONS

This application is related to U.S. patent application Ser. No. 13/488,255, entitled "System and Method for Rapid Cluster Analysis of Hyperspectral Images," filed Jun. 4, 2012, U.S. patent application Ser. No. 13/371,160, entitled "System and Method for Hyperspectral Image Compression," filed Feb. 10, 2012, U.S. patent application Ser. No. 13/085,883, entitled "Optimized Orthonormal System and Method for Reducing Dimensionality of Hyperspectral Images," filed Apr. 13, 2011, U.S. patent application Ser. No. 12/475,145, entitled "System and Method for Reducing Dimensionality of Hyperspectral Images," filed May 29, 2009, and U.S. patent application Ser. No. 11/856,588, entitled "Hyperspectral Image Dimension Reduction System and Method," filed Sep. 17, 2007, the disclosures of each of which are hereby incorporated by reference in their entireties.

BACKGROUND

This disclosure relates to analysis of hyperspectral image data, and as described in greater detail below, relates in particular to creating dimensionality reduced hyperspectral image data, which may be based on an optimized set of basis vectors. While compression reduces the size of a data set, it typically results in a loss of access to information content. On the other hand, dimensionality reduction techniques provide compression with the ability to extract information from the data set in its reduced size. Thus, while all dimensionality reduction techniques provide compression, not all compression techniques allow for dimensionality reduction.

Hyperspectral sensors can collect image data across a multitude of spectral bands through a combination of technology associated with spectroscopy and remote imaging. Thus, such sensors can capture sufficient information to derive an approximation of the spectrum for each pixel in an image. In addition to having a color value, each pixel in the image additionally has a third dimension for a vector providing distinct information for the pixel over a large spectrum of wavelengths. This contiguous spectrum may be analyzed to separate and evaluate differing wavelengths, which may permit finer resolution and greater perception of information contained in the image. From such data, hyperspectral imaging systems may be able to characterize targets, materials, and changes to an image, providing a detection granularity which may exceed the actual resolution of pixels in the image and a change identification capability that does not require pixel level registration, which may provide benefits in a wide array of practical applications.

Because each pixel carries information over a wide spectrum of wavelengths, the size of a hyperspectral data set may often quickly become unwieldy in terms of the size of data that is being recorded by the hyperspectral sensor. As an example, hyperspectral sensors are often located remotely on satellites or aircraft capable of imaging areas in excess of 500 km×500 km per hour, which may result in the hyperspectral sensors generating anywhere from three to fifteen gigabits of data per second. Where the hyperspectral data needs to be processed in near real time, the large size of the data may introduce latency problems. In some cases, it may be desirable to transmit the data to a remote location for processing or other analysis, which again would make a reduced data size desirable. Additionally, it may be appreciated that large quantities of data may be difficult to analyze.

While lossy and/or lossless compression techniques may increase the transmission and processing rate for hyperspectral images, these techniques also suffer from various drawbacks. For example, while lossy compression methods may be fine for casual photographs or other human viewable images, wherein the data that is removed may be beyond the eye's ability to resolve, applying such lossy compression methods to a hyperspectral data set may remove information that is valuable and desired for further computer or mathematical processing. Such removal of data may undermine the ability to characterize targets, materials, or changes to scenes that are captured in hyperspectral images. Lossless data compression would not remove such valuable information, since lossless algorithms produce a new data set that can subsequently be decompressed to extract the original data set. Although general purpose lossless compression algorithms can theoretically be used on any type of data, existing lossless compression algorithms typically cannot achieve significant compression on a different type data than that which the algorithms were designed to compress. Thus, existing lossless compression algorithms do not provide a suitable guaranteed compression factor for hyperspectral images, and in certain cases, the decompressed data set may even be larger than the original data set.

Dimensionality reduction techniques strike a balance between the loss of data resulting from lossy compression, and the increased processing requirements of lossless techniques. For example, the dimensionality reduction techniques may identify information that is of particular importance, and segregate it such that it is not reduced, while reducing the remaining information that is of less value. Thus, the use of dimensionality reduction on hyperspectral data sets allows for transformation of the hyperspectral image into a more compact form, with little to no loss of the most relevant information. At the same time, it is advantageous for dimensionality reduction techniques to facilitate rapid processing of a reduced hyperspectral image data set. In the case of hyperspectral imaging data, this generally means that the dimensionality reduced data may be exploited for target detection, anomaly detection, material identification, classification mapping, or so on. Typically for dimensionality reduction of hyperspectral images, a family of functions or a set of vectors are found whose arithmetic combination can represent all of the data in a three-dimensional (3D) data set. Hyperspectral image data is generally discrete, so at each X/Y location in a hyperspectral image the spectral data may form elements of a vector. Depending on the nature of these vectors, they may either be characterized as endmembers or basis vectors. While basis vectors span the data obtained from the image, and form a mathematical basis for the data, endmembers are pixels from an imaged scene (or extrapolations of pixels in the scene), that represent the spectra of a pure material found in the scene. In some cases, endmembers are derived such that they enclose or bound the data set (as in a hypervolume or a simplex).

It may be appreciated that some dimensionality reduction techniques such as those disclosed in the related applications incorporated by reference above, may compute geometric basis vectors. Dimensionality reduction may alternatively be achieved through other hyperspectral image processing mechanisms, including but not limited to Principal Components Analysis, which computes "statistically derived' basis vectors that span a scene in an optimal mean-square sense.

This disclosure additionally relates to clustering of pixels of hyperspectral image data. Clustering is a process which finds pixels that are more similar to each other than to other groups of pixels. In particular, such clustering may be utilized to determine pixels containing like materials and outliers. It may be appreciated that when a scene is being imaged, different materials and different contrast within the scene may form a generally heterogeneous data set. Accordingly, clustering may break up the scene into more homogeneous portions. Having identified homogenous regions of similar spectral properties, it may be easier to reject clutter. Additionally, such clusters may be utilized to create classification maps, which may be useful in characterizing the hyperspectral image. As one non-limiting example, a variety of clusters may be determined from the hyperspectral image data, including a cluster of pixels that represent grass, a cluster of pixels that represent water, a cluster of pixels that represent metal, and so on. It may be appreciated that clustering may also detect anomalies, such as determining those pixels that are outliers from the established clusters (or are identified as among the smallest clusters). Such clusters may further be useful in identifying pixels with similar spectral properties, which may be exploited in further analysis.

In a conventional implementation, clustering may include selecting an initial number of clusters followed by an initial assignment of every pixel to a cluster. In some cases, this assignment may be designated by a user. Tentative center coordinates for each cluster may be formed from the data or selected for each cluster. For example, the centers may be spaced uniformly to one another, or may be randomly distributed in the scene. Pixels may be assigned to the cluster whose center is nearest (e.g., the smallest distance to the center coordinates). The average coordinates of each cluster, including the added pixels, may then be computed to form the cluster center for the next iteration. In the next iteration, pixels would then be reassigned to the various clusters in an iterative process, with the iterations stopping when certain conditions are met. For example, in some implementations, a user-selected number of iterations may be performed. Alternatively, a stability condition may ultimately be reached, which signifies the end of the iterative process. For example, the cluster center may stop moving, or may move less than a certain distance. As another example, fewer than a certain percentage of pixels may change clusters from the past iteration. In still another example, each of the clusters may settle into a predetermined size or density range (e.g., the iterations end when clusters are not too small, too large, or insufficiently dense). Constraints may be made on the configuration of an allowable cluster, such as by splitting clusters that are too small (redistributing the pixels from the small clusters into other appropriate cluster), splitting clusters that are too large into smaller clusters, or so on.

It may therefore be appreciated that conventional clustering, typically performed as a discrete process on full dimensioned hyperspectral image data, is generally a highly iterative and slow process. For example, many iterations of the computations, such as distance comparisons between pixels and each cluster, may be required to establish the clusters of pixels. Accordingly, among other things, it is advantageous to increase the speed at which stable clusters are identified. Speed may be increased by reducing the number of iterations and reducing the computations associated with each iteration. However, it is important that pixels are assigned to the correct clusters at the end of the clustering processing.

SUMMARY

According to an embodiment, a method of clustering and reducing hyperspectral image data having a plurality of spatial pixels, and a plurality of spectral dimensions associated with each spatial pixel, includes computing an initial basis vector associated with the hyperspectral image data. The method also includes unmixing the initial basis vector with the hyperspectral image data to generate an initial set of coefficients and an associated set of residual vectors. The method additionally includes generating a set of clusters based on the initial set of coefficients. The method further includes iteratively computing one or more additional basis vectors and updating the set of clusters. The iterative computing includes calculating a subsequent basis vector based on a residual vector associated with a prior unmixing. The iterative computing also includes unmixing the subsequent basis vector with a prior set of residual vectors to generate additional coefficients associated with each pixel. The iterative computing further includes iteratively computing cluster centers and content including an additional dimension associated with the subsequent basis vector.

According to another embodiment, a system configured to cluster and reduce hyperspectral image data having a plurality of spatial pixels, and a plurality of spectral dimensions associated with each spatial pixel, includes one or more processors. The one or more processors are configured to compute an initial basis vector associated with the hyperspectral image data. The one or more processors are also configured to unmix the initial basis vector with the hyperspectral image data to generate an initial set of coefficients and an associated set of residual vectors. The one or more processors are additionally configured to generate a set of clusters based on the initial set of coefficients, and iteratively compute one or more additional basis vectors and update the set of clusters. The iterative computation includes calculating a subsequent basis vector based on a residual vector associated with a prior unmixing. The iterative computation further includes unmixing the subsequent basis vector with a prior set of residual vectors to generate additional coefficients associated with each pixel. The iterative computation further includes iteratively computing cluster centers and content including an additional dimension associated with the subsequent basis vector.

According to another embodiment, a method of clustering and reducing hyperspectral image data having a plurality of spatial pixels, and a plurality of spectral dimensions associated with each spatial pixel, includes computing an initial basis vector associated with the hyperspectral image data. The method also includes unmixing the initial basis vector with the hyperspectral image data to generate an initial set of coefficients and an associated set of residual vectors. The method additionally includes generating histograms of the initial set of coefficients to determine a number of pixels having a value within a given range of a value of the coefficient. The method further includes generating a set of clusters based on the histograms of the initial set of coefficients. The method furthermore includes iteratively computing one or more additional basis vectors and updating the set of clusters. The iteratively computing includes calculating a subsequent basis vector based on a residual vector associated with a prior unmixing. The iteratively computing also includes unmixing the subsequent basis vector with a prior set of residual vectors to generate additional coefficients associated with each pixel. The iteratively computing further includes iteratively generating histograms of the additional coefficients associated with the subsequent basis vector to identify new clusters.

Other features of this disclosure and the inventive concept described herein will be apparent to those skilled in the art based on the following drawings and detailed description.

DETAILED DESCRIPTION

Figure 1:
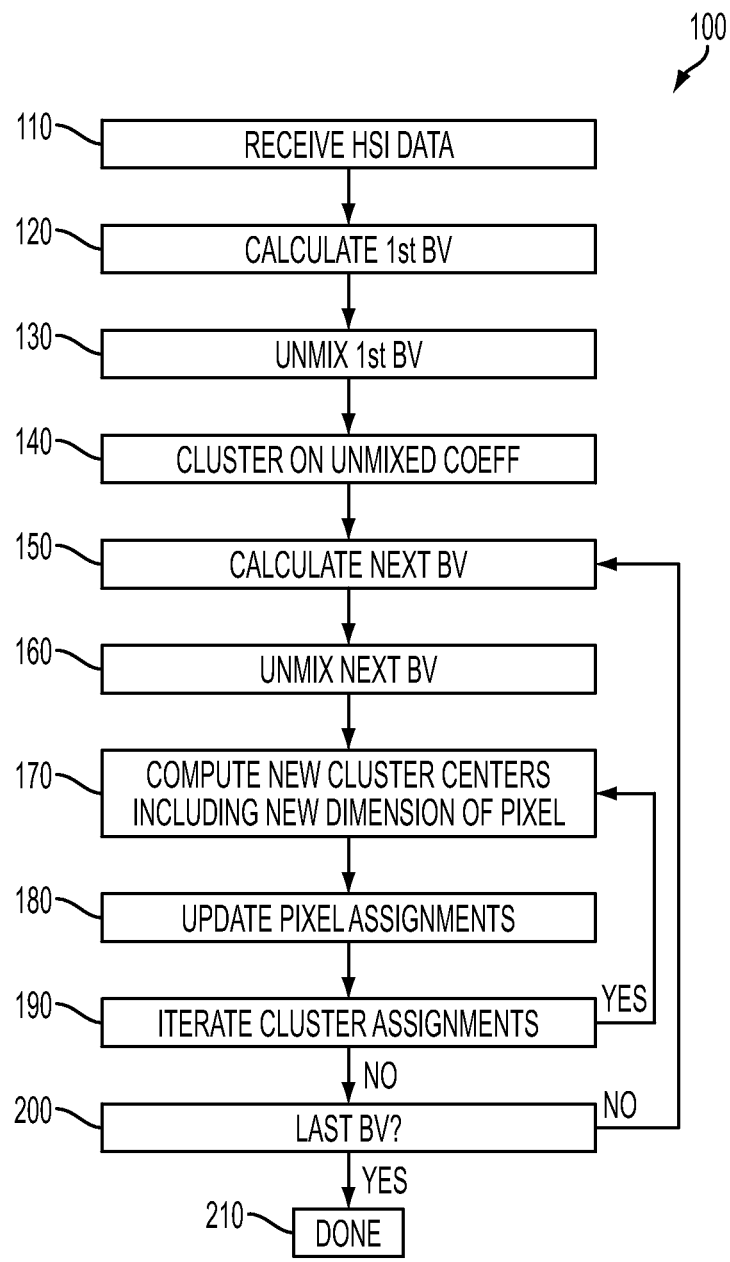
FIG. 1 illustrates a flowchart depicting an exemplary method for processing one or more hyperspectral images, according to an embodiment, based on a desired number of basis vectors.

FIG. 1 illustrates an embodiment of a method of clustering and dimensionality reduction 100. As shown, in an embodiment, the method of clustering may include at 110 receiving hyperspectral image data (including, for example, a hyperspectral image). The hyperspectral image data received at 110 may be of any appropriate configuration, or may be received from any appropriate source. In an embodiment, the hyperspectral image data may be considered a hyperspectral image data cube, comprising both spatial and spectral dimensions. Specifically, the hyperspectral image data may be understood as generally containing two spatial dimensions, corresponding to the scene, and a third spectral dimension. In some embodiments, the hyperspectral image data may be characterized as vectors, having an X,Y spatial coordinate, and a set of values in the spectral dimension (e.g., associated with particular wavelength values). For example, in an embodiment, the hyperspectral image data received at 110 may be arranged to include a plurality of pixels associated with spatial locations therein, while each pixel includes spectral data associated with that spatial location. Additional dimensions in the hyperspectral image data are also possible in some embodiments, such that spectral vectors are recorded therein. In an embodiment, a system configured to perform the method of clustering and dimensionality reduction 100 may be the same system that generates the hyperspectral image data. As described in greater detail below, in some embodiments, receiving the hyperspectral image data cube at 110 may include utilizing the hyperspectral imaging system, which in some embodiments may include a remote imaging system (e.g., a satellite, an aerial surveillance system, or any other system that can capture hyperspectral images). In an embodiment, the hyperspectral imaging system may be configured to capture one or more hyperspectral images of a particular scene corresponding to a geographical area.

It may be appreciated that the hyperspectral imaging system may capture hyperspectral image data across the spectrum of wavelengths, thereby generating a data set corresponding to a hyperspectral image of scene. In some embodiments, a system configured to perform the method of clustering and dimensionality reduction 100 may be separate and discrete from that configured to capture or otherwise generate the hyperspectral image data cube. In such an embodiment, receiving the hyperspectral image data at 110 may include accessing stored hyperspectral image data, either stored locally to the system performing the method of clustering and dimensionality reduction 100, or coupled to such a system (e.g., through a network).

As described in greater detail below, performing clustering of the hyperspectral image data received at 110 in an integrated manner with reducing the dimensionality thereof, may result in an increased speed of clustering the pixels thereof. In particular, the speed of clustering is generally highly dependent on the number of iterations and the computation of the cluster distances, as described above. Accordingly, reducing the time spent iterating and/or computing distances between pixels and the adjacent clusters is desirable. The method of clustering and dimensionality reduction 100 may be configured to compute basis vectors associated with the hyperspectral image data. Specifically, the basis vectors may be utilized in creating a dimensionally reduced configuration of the hyperspectral image data. As shown in the illustrated embodiment, after receiving the hyperspectral image data at 110, method 100 may continue at 120 by calculating a first basis vector associated with the hyperspectral image data. Calculating the first basis vector at 120 may be performed through any appropriate algorithm or computation, including but not limited to those disclosed in the related applications incorporated by reference above. For example, in an embodiment the first basis vector calculated at 120 (and/or subsequent basis vectors additionally calculated, as described below) may be derived without a priori knowledge of imaged scene, wherein the basis vectors may instead be derived to span background materials, statistically sparse targets, or other relevant objects within the scene. As an example, the basis vectors may be calculated from the hyperspectral image data in a manner that represents endmembers for pixel spectra associated with unique objects or other targets in scene imaged in the hyperspectral image data. In some embodiments, analysts or other users may alternatively or additionally select one or more pixel spectra to derive a specific basis vector.

After the first basis vector is calculated at 120, method 100 may continue by decomposing the first basis vector with the hyperspectral image data, to generate coefficients associated therewith. In the illustrated embodiment, such decomposing comprises, at 130, unmixing the basis vector against the hyperspectral image data. Unmixing, as used herein without further modifiers, is understood to generically refer to the broad concept of unconstrained unmixing. In an embodiment, the unmixing at 130 may comprise computing the dot product of the first basis vector with each (spatial) pixel of the hyperspectral image data, and a residual vector associated therewith. The computed dot product for each pixel is a scalar value associated with the first basis vector, and may be understood as the first element of the dimensionality reduced data, an unmixing coefficient of the dimensionally reduced data. Both the computed dot product (the scalar value) and the residual vector may be stored, and may be accessed during the remainder of the performance of method 100, or during subsequent processing. In an embodiment, the unmixing at 130 may include identifying outliers or anomalies, which might not be dimensionally reduced, but may instead be set aside so as to be retained as unreduced pixels suitable for subsequent analysis. For example, in an embodiment the outliers may be determined incrementally (e.g., while unmixing a first basis vector with the hyperspectral image data might not indicate any of the pixels as outliers, unmixing a second basis vector with the hyperspectral image data may indicate that certain pixels are anomalous). As such, in an embodiment, outliers may be identified on a per-coefficient basis. In an embodiment, outliers may be based on a lack of similarity to other clusters, as described in greater detail below, since pixels that differ from all clusters in some basis vector would not get merged into those clusters based on the values resulting from other basis vectors.

Method 100 may continue at 140 by establishing initial cluster assignments based on the coefficients obtained through the unmixing at 130. In an embodiment, the initial clustering at 140 may include assigning pixels to various clusters based on the scalar coefficient associated therewith. For example, in an embodiment, pixels having low scalar values may be assigned to a first cluster, pixels having intermediate scalar values may be assigned to a second cluster, and pixels having high scalar values may be assigned to a third cluster. In an embodiment, the coefficients may range from −1 to 1. In an embodiment, the coefficient values may generally be divided into equally spaced centers (e.g., if there are 7 centers selected, they may be located at −3/4, −1/2, −1/4, 0, 1/4, 1/2, and 3/4). In an embodiment, the number of centers (e.g., number of initial clusters) may be a user-selected value. It may be appreciated that any appropriate number of initial centers are possible, and may be user-selected as an input.

The division of pixels into initial cluster assignments may vary across embodiments. For example, in some embodiments the scalar value determination of cluster assignment may depend on the number of clusters. The number of clusters may be based on a user-selected value, as indicated above. In another embodiment, the number of clusters may depend on the scalar values identified in the unmixing at 130. For example, where a variance between the scalar values indicates a grouping between certain pixels (e.g., where certain sets of scalar values are closer together than other sets of scalar values) those groupings may be utilized to establish not only the initial cluster assignments, but the number of initial clusters. It may be appreciated that in some embodiments, the number of clusters may grow (e.g., a cluster may be split into multiple clusters), or the number of clusters may shrink (e.g., multiple clusters may be merged) as method 100 proceeds. In some embodiments where outliers or anomalies are identified during the unmixing, those anomalous pixels may be treated as separate clusters. In other such embodiments, the group of anomalous pixels may be treated as an "anomaly" cluster. In still other embodiments, the anomalous pixels may be excluded from being clustered.

After the initial clustering at 140 is complete, method 100 may continue at 150 by calculating a subsequent basis vector. It may be appreciated that the subsequent basis vector may be computed by any appropriate process, including but not limited to that disclosed in U.S. patent application Ser. No. 13/085,883, incorporated by reference above. For example, the subsequent basis vector may be computed by normalizing the residual vector of those computed at 130 having a largest residual magnitude. It may be appreciated that the normalized residual vector may be orthogonal to the first basis vector calculated at 120, and with its normalization, may be an orthonormal vector. The orthonormal vector computed at 150 may thus be utilized as the subsequent basis vector. It may be appreciated that constraining each basis vector to be orthogonal to the previous basis vector has substantial advantages in the efficiency of processing, since the unmixing can proceed one basis vector at a time without consideration of correlations in the basis vectors which may modify previous calculated basis vector coefficients or clustering.

Method 100 may then continue at 160 by unmixing the subsequent basis vector computed at 150 with the residual vector at each pixel. As indicated above, such unmixing may comprise computing the dot product between the subsequent basis vector and the residual vector at each pixel. The unmixing at 160 may therefore obtain a subsequent coefficient associated with each pixel, which again may be understood to be a scalar value associated with each pixel.

Having computed the subsequent coefficient for each pixel, method 100 may continue at 170 by computing new cluster centers based on the subsequent scalar values. Such further computation of the cluster centers may be considered as refining the clusters. In an embodiment, the new cluster centers may be determined by computing the average values of all those pixels in each cluster. The average then becomes the new cluster center containing one additional dimension than the previous cluster center. Typically, the initial calculation of cluster centers, using the previous cluster assignments, will be the same in all previous orthonormal basis vectors, with an additional dimension added to the vector expressing the cluster center. As all pixel distances are recalculated with an additional dimension, however, some pixel assignments may change, resulting in the cluster centers changing. Additionally, because the new cluster is based on additional information (e.g., dimensions), the new cluster center will be more accurate than the prior cluster center.

Having computed the clusters based on the new cluster centers, the assignment of pixels to each cluster may be updated at 180. In an embodiment, the distance between each pixel and each new cluster center is then calculated, including the added dimension. In some embodiments the distance may be computed as the Euclidean distance (e.g., the geometric distance), or may be computed as the Mahalanobis distance (e.g., the distance being weighted by a spectral covariance of the cluster). If a pixel is closer to the center of a different cluster, it may be reassigned to that cluster. It may be appreciated that the "distance" computation is not necessarily a physical (e.g., spatial) distance, but is instead a hyperspectral distance that may be based on the endpoints of the spectral vector associated with each pixel.

Having updated the pixel assignments into each cluster at 180, method 100 may continue at 190 by determining whether to iterate cluster assignments. If so, method 100 may proceed by looping back and recalculating the cluster centers at 170 for the new pixel assignments and recalculating the pixel distances and assignments at 180 for the updated cluster centers. In some embodiments, the iteration determination at 190 may end (i.e., by determining not to iterate cluster assignments) after a specified number of iterations, or when cluster changes are sufficiently small (which, for example, may be based on a threshold value, comparing the movement of the cluster center to prior movements of the cluster center, or by any other appropriate determinative factor).

By making clustering decisions incrementally, based initially on a small number of coefficients, and updating the clusters as additional basis vectors are computed and unmixed to generate additional coefficients, it may be appreciated that the calculations for the clustering may be simpler than would be found when attempting to cluster based on a complete hyperspectral data set. In particular, it may be appreciated that such incremental computation of the basis vectors and coefficients and contemporaneous clustering may be more rapid than clustering based on either the original pixels of the hyperspectral image data, or even clustering based on a full set of dimensionally reduced hyperspectral image data, such as is discussed in U.S. patent application Ser. No. 13/488,255, incorporated by reference above. Specifically, the initial iterations, which utilize a small number of coefficients associated with each pixel, may be computed very quickly. As additional basis vectors and coefficients are computed (in essence adding elements to the dimensionality reduced data), the movement of the clusters would be more stable, further facilitating less intense computations, and resulting in a more efficient process overall.

It may be appreciated that the processes of calculating subsequent basis vectors and reclustering based thereon in method 100 may continue until a completion condition is met. As shown in the illustrated embodiment, where there is a fixed number of basis vectors, method 100 may continue by determining at 200 if the current basis vector that has been calculated and utilized in the clustering is the last basis vector. If not, then method 100 may return to 150, calculating still another subsequent basis vector. Such looping of the calculation of basis vectors and reclustering may continue until it is determined at 200 that there are no additional basis vectors to compute.

When it is determined at 200 that the current basis vector is the last basis vector, then method 100 may end at 210. In an embodiment, such termination at 210 may comprise outputting the set of coefficients (arranged in an array or other usable format), which may be considered dimensionally reduced hyperspectral image data. As noted above, in some embodiments outliers, such as statistical anomalies from the scene, may be determined during the unmixing, and may be output separately from the dimensionally reduced hyperspectral image data. Additionally, clustering data associated with the hyperspectral image data (e.g., a listing of each cluster, and the pixels associated therewith) may also be output at 210. By being "output," the dimensionally reduced hyperspectral image data, the clustering data, outliers, and/or other associated data may be displayed, stored, saved (e.g., in a memory device or in persistent storage), or otherwise made accessible for future computations, analysis, or consideration.

In an embodiment, the outputting at 210 may comprise outputting a classification map. For example, where the clusters represent different materials, the classification of each cluster may correspond to identification of the materials in the scene. As a specific example, those pixels representing a first material (e.g., water) may be highlighted as such in the classification map, while those pixels representing a second material (e.g., earth) may be highlighted differently from the first material. As noted, in an embodiment, anomalies may also be output at 210. In an embodiment, outputting the anomalies at 210 may include declaring certain pixels as anomalous, which may include highlighting them in the classification map as anomalous pixels. While in some embodiments all anomalous pixels may be highlighted as such with the same identifier indicating that the pixel is anomalous, on other embodiments where the anomalous pixels are distinct from one another, declaring the anomalous pixels may include providing a separate identifier for each anomalous pixel. For example, each distinct anomalous pixel or anomalous set of pixels may be treated as a separate cluster.

Figure 2:
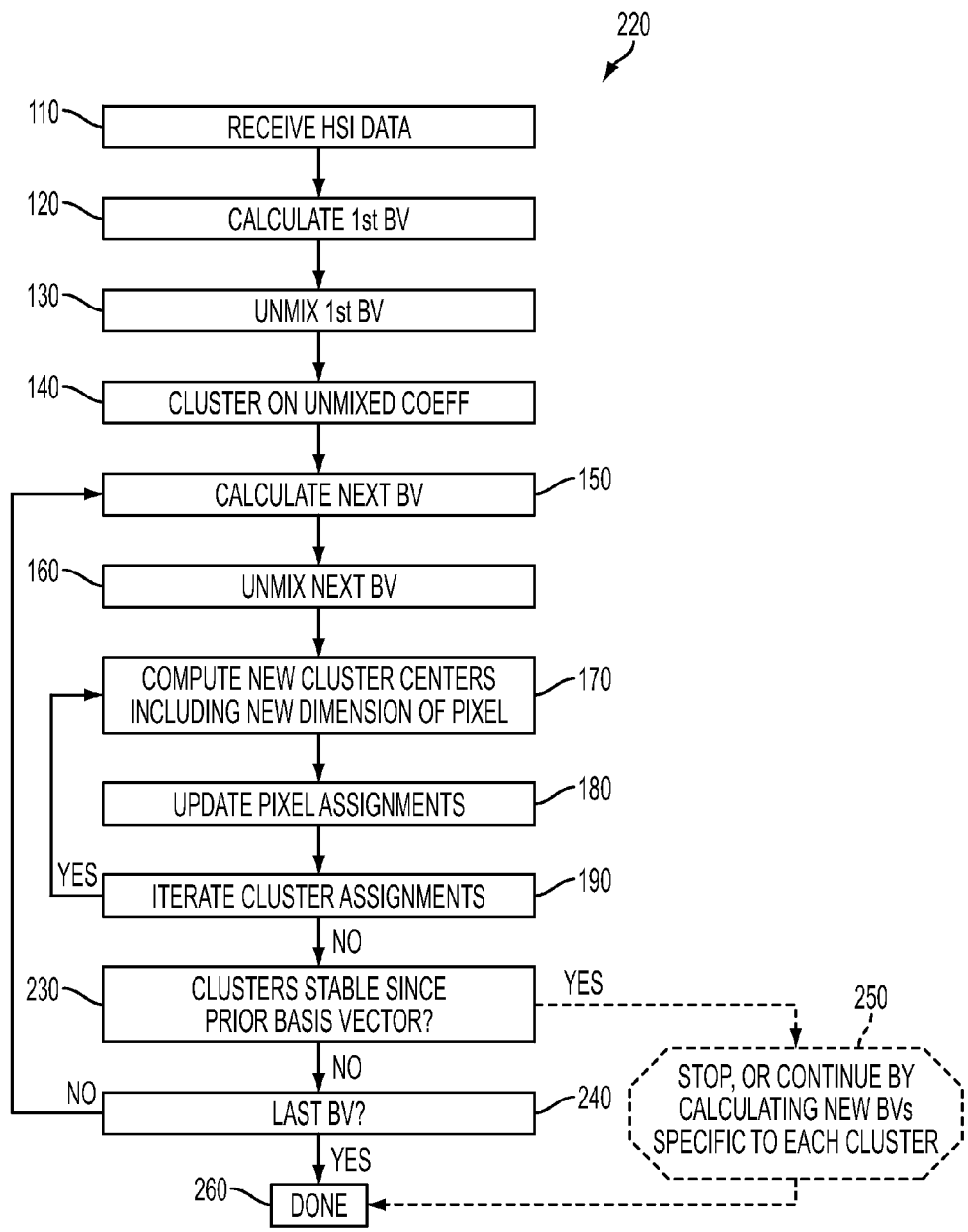
FIG. 2 illustrates a flowchart depicting an exemplary method for processing one or more hyperspectral images, according to an embodiment, based on stability of computed clusters.

In some embodiments, a stability condition associated with the clusters may be configured to determine that the method of dimensionality reduction and clustering is complete. For example, FIG. 2 illustrates a method 220 of dimensionality reduction and clustering. In some embodiments, portions of the method 220 may be generally similar to embodiments of those described above in method 100. As such, FIG. 2 identifies similar processes with the same identifier as utilized in FIG. 1. Specifically, method 220 may begin at 110 by receiving the hyperspectral image data, as described above. Method 220 may then continue at 120 by calculating a first basis vector, and proceed at 130 by unmixing the first basis vector with the pixels of the hyperspectral image data. Method 220 may then continue at 140 by clustering based on the coefficients derived from the unmixing.

Having established the initial basis vector, coefficients, and clusters, method 220 may continue at 150 by calculating a subsequent basis vector, and proceed further at 160 by unmixing the subsequent basis vector. Method 220 may then also proceed at 170 by computing new cluster centers based on the results of the unmixing at 160. Having computed the new cluster centers at 170, method 220 may continue at 180 by updating pixel distances and assignments as described above. Method 220 may then proceed to 190 with determining whether to iterate cluster assignments, as described above. If so, iterating cluster assignments at 190 may include returning to 170 and recomputing the new cluster centers at 170, before continue at 180 by updating pixel distances and assignments.

As FIG. 2 illustrates, if it is determined at 190 that cluster assignments are not to be updated, then in an embodiment method 220 may continue at 230 by determining if the clusters have been stable since the addition of the most recent basis vector. In an embodiment, the prior iteration may be based on the clustering at 140, while in other embodiments, the prior iteration may be from a prior computation of a basis vector at 150, as described below. In some embodiments, a minimum number of computations may be required before the determining of cluster stability at 230 is performed.

In an embodiment, determining that the clusters are stable at 230 may comprise determining if the cluster center did not move, or moves less than a certain (e.g., user defined or pre-determined) amount, from one iteration to the next. As another example, if less than a certain (e.g., user defined or pre-determined) number of pixels change clusters, then the clusters may also be considered stable. Other cluster rules may be applied to determine when the iterative basis vector and coefficient computation, and contemporaneous clustering may conclude. It may be appreciated that in embodiments where the number of pixels, or the size of cluster center movement, are utilized as a stability condition, and are user defined, the defined threshold value may be input by any appropriate mechanism, including through any suitable user interface. In some embodiments utilizing pixels changing clusters as a pre-determined stability condition, the stability condition for pixels changing clusters may be, for example, set as less than a number of the pixels (e.g., less than 50 pixels changing clusters), or may be set as less than a fraction or percent of the overall pixels (e.g., less than 5% of the pixels changing clusters). Likewise, in embodiments where movement of the cluster center is a stability condition, the stability condition may be determined as a distance in hyperspectral dimensions (e.g., movement of the cluster center is less than a specified distance or angular change from the prior iteration), or may be as a fraction or percentage (e.g., movement of the cluster center from the prior iteration is less than 5% of the distance to the nearest cluster).

If the clusters are determined to not be stable at 230 (e.g., the center of the cluster and/or the pixels associated therewith change by some determined amount during method 220 from one iteration to the next), method 220 may continue at 240 by determining whether additional basis vectors are to be computed. In some embodiments, such determining at 240 may be analogous the determining at 200 of method 100. As such, if it is determined at 240 that the current basis vector is not the last basis vector, method 220 may return to 150, wherein a subsequent basis vector is calculated. In an embodiment, the determining at 240 may generally assume that if the clusters were not stable at 230, an additional basis vector should be calculated, and the iteration may continue by returning to 150. In some such embodiments, determining whether the current basis vector is the last basis vector at 240 may comprise determining whether an additional basis vector can be computed. For example, the determining at 240 may include computing whether calculating an additional basis vector and generating coefficients associated therewith would be of any greater dimensionality reduction benefit than utilizing the unreduced hyperspectral image data. Such computation may include calculating an error associated with the dimensionally reduced data (from the coefficients) as compared to the hyperspectral image data, and determining if the error is greater or less than a threshold value (e.g., one that is user determined). Such computation may also or alternatively include calculating a data size associated with the dimensionally reduced as compared to that of the hyperspectral image data, and determining if the data size is greater or less than a threshold value (e.g., pre-set, user determined, or so on).

If it is determined at 240 that the clusters have been stable since the last iteration of computing the subsequent basis vector, method 220 may continue at 250 by either stopping (which may be generally similar to terminating at 260, as described below), or continuing by calculating new basis vectors specific to each cluster. If continuing at 250 means that method 220 stops, then it may be determined that additional basis vectors are not needed, and stopping at 250 may include informing the user that additional basis vectors are unnecessary. Where it is determined that new basis vectors are to be calculated specific to each cluster, continuing at 250 may include treating the pixels in each stable cluster as a separate dataset, and adding additional basis vectors for each cluster. In an embodiment, continuing at 250 may include testing whether the clusters should be split into additional classes when adding the additional basis vectors. Specifically, when additional dimensions of information are added to each cluster, pixels in a given cluster may have different values in those dimensions, thus splitting the cluster.

After the last basis vector is determined to have been calculated at 240, or after continuing at 250 is complete (either by stopping or by completing calculating the new basis vectors specific to each cluster), method 220 may terminate at 260. Similarly to terminating at 210, terminating at 260 may comprise outputting the set of coefficients as dimensionally reduced hyperspectral imaging data, outputting the set of basis vectors associated therewith, outputting outliers/anomalies, and/or outputting the clustering data. Other data computed or manipulated in method 220 may also be output when terminating at 260.

Figure 3:
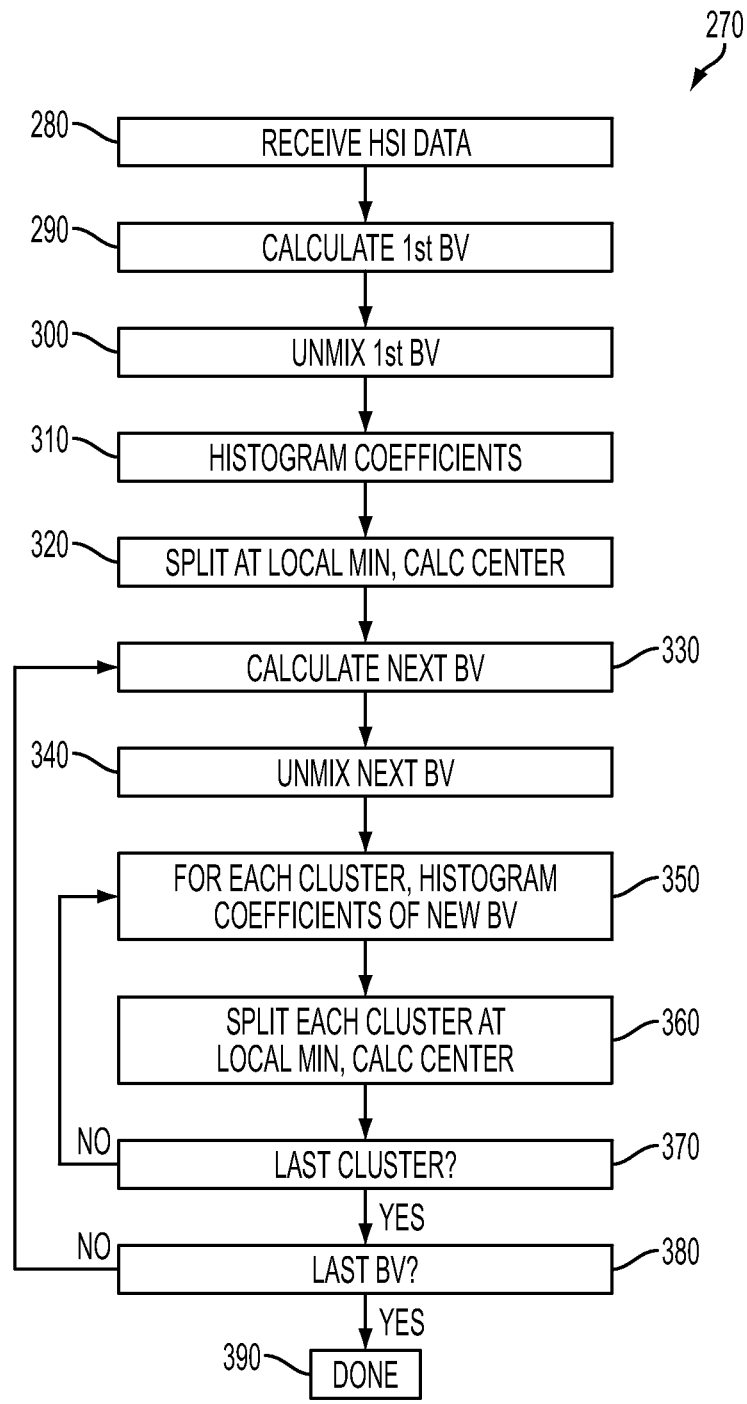
FIG. 3 illustrates a flowchart depicting an exemplary method for processing one or more hyperspectral images, according to an embodiment, based on histogrammed coefficients associated therewith.

In some embodiments, the clustering and dimensionality reduction may be configured to utilize histogramming analysis. Specifically FIG. 3 illustrates a method 270 of clustering and dimensionality reduction. Method 270 includes at 280 receiving hyperspectral image data. In an embodiment, receiving the hyperspectral image data at 280 may be similar to receiving the hyperspectral image data at 110 as described above with regard to method 100 and method 220. Having received the hyperspectral image data at 280, method 270 may continue to 290, by calculating a first basis vector associated with the hyperspectral image data, and further proceed to 300 by unmixing the first basis vector with the hyperspectral image data to generate the set of coefficients associated with the hyperspectral image data. It may be appreciated that calculating the first basis vector at 290 and unmixing the first basis vector at 300 may generally be similar to calculating the first basis vector at 120 and unmixing the first basis vector at 130 as described above with regard to method 100 and method 200.

Figure 4:
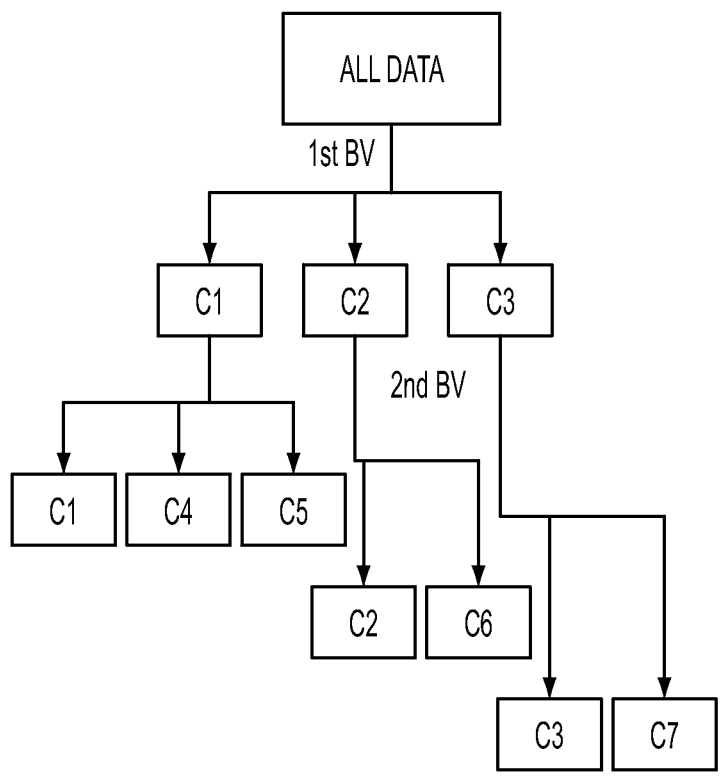
FIG. 4 schematically illustrates a division of clusters associated with sets of basis vectors and the histogrammed coefficient associated method of FIG. 3.
Figure 5:
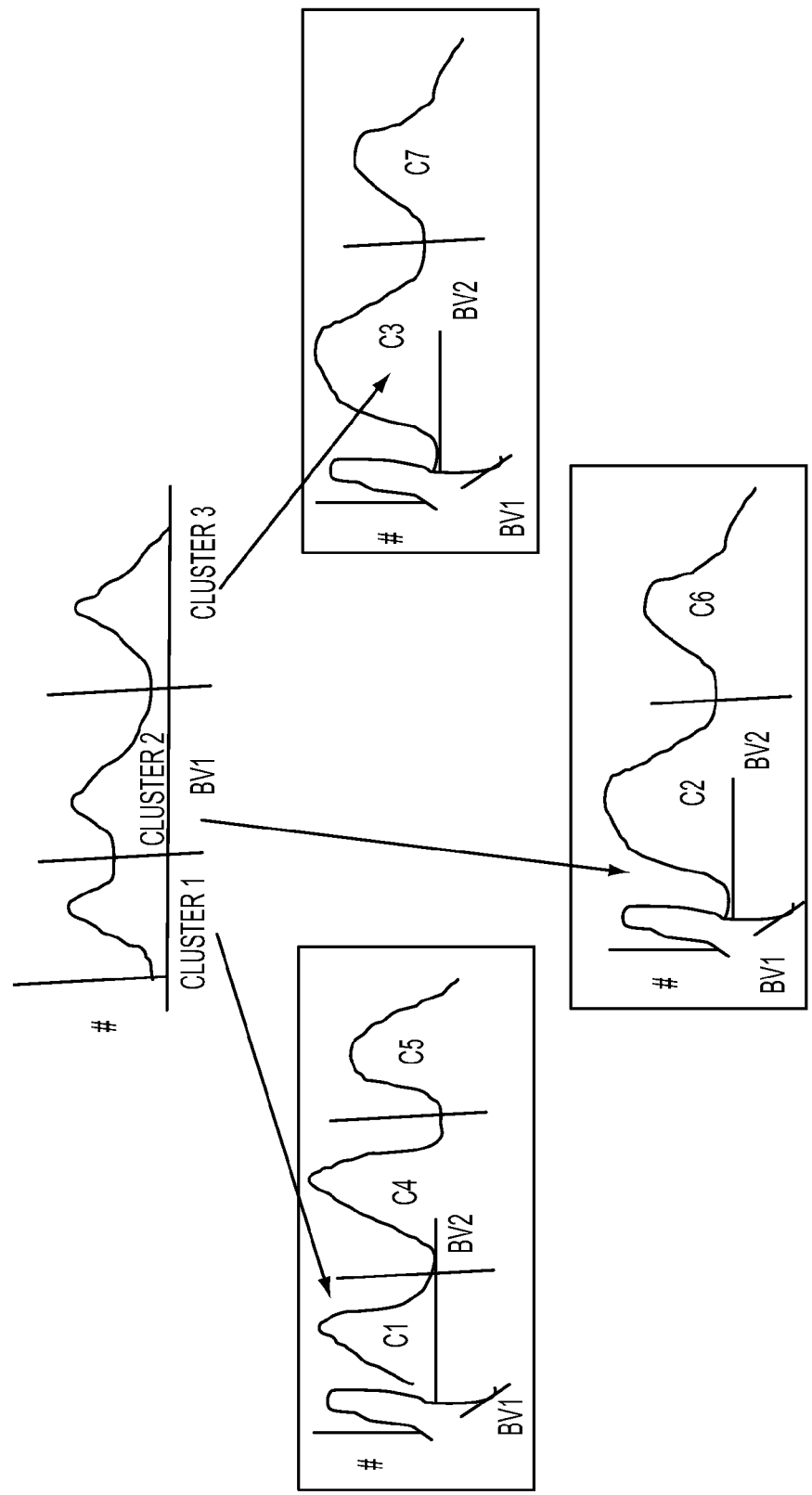
FIG. 5 illustrates an example of division of clusters utilizing the histogrammed coefficients from the method of FIG. 3.

Once the coefficients associated with the first basis vector are generated at 300, method 270 may continue at 310 by histogramming the coefficients. As illustrated in FIGS. 4 and 5, histogramming the coefficients at 310 may comprise plotting the coefficients in a manner that allows identification of clusters therein. For example, in the illustrated embodiment, the x-axis is the value of the first basis vector coefficient, and the y-axis is the number of pixels within a given range of x (e.g., the number of pixels with first basis vector coefficients between 0.9 and 1.1). In an embodiment, the plot may be generated by creating the bins for the histogram and counting the number of pixels with values within each bin. It may be appreciated in FIG. 5 that in some embodiments, local minimums along the x-axis allow divisions between groups of coefficients to establish cluster 1, cluster 2, and cluster 3 (C1, C2, and C3 in FIG. 4 and FIG. 5).

Returning to FIG. 3, once the coefficients from the first basis vector are histogrammed at 310, method 270 may continue at 320 by splitting the pixels associated with the coefficients into clusters separated by local minimums of the histogram, and calculating a center of the cluster based on the pixels being in the cluster via the histogram. Method 270 may then continue by calculating a subsequent basis vector at 330. In an embodiment, calculating the subsequent basis vector at 330 may be similar to calculating the subsequent basis vector at 150 of method 100 or method 220. Once the subsequent basis vector is calculated at 330, it may be unmixed with the hyperspectral image data at 340. Unmixing the subsequent basis vector at 340 may generally be similar to unmixing the subsequent basis vector at 160, as described above with reference to method 100 or method 220.

As shown in FIG. 3, method 270 may continue at 350 by histogramming the coefficients of the subsequent basis vector generated at 330 for each cluster generated at 320. Specifically, the histogramming at 350 may comprise selecting only the subset of pixels that form the cluster computed at 320, and plotting the number of pixels in each second basis vector bin versus the center value of the bin associated with the second basis vector computed at 330. In FIG. 5, it may be appreciated that the data associated with the first basis vector ("BV1") is understood to be extending out of the Figure. As such, by viewing the histogram along the axis established by the subsequent basis vector (e.g., "BV2"), the distribution of coefficients from the subsequent basis vector may be seen and analyzed for each cluster previously formed from the previous basis vectors. Again, local minimums may present themselves throughout the histogrammed distribution, lending themselves to additional clusters being identified at 360. In the examples of FIGS. 4 and 5, where there are three clusters identified with the first basis vector (i.e., C1, C2, and C3) and two additional clusters split from the first cluster when the second basis vector is considered, the subsequent clusters split from C1 may be sequentially C4 and C5. Once the additional clusters are identified at 360, a center of the new clusters may be calculated. It may be appreciated that the number of pixels associated with C1 will decrease when C4 and C5 are identified. As such, C1 may be understood as splitting into a "new" C1, as well as C2 and C3 as illustrated herein. As shown in FIG. 3, the histogrammed cluster analysis may continue at 370 by determining if the initial clusters determined based on the first basis vector have been split. If not, method 270 may return to histogramming the coefficients of the subsequent basis vector at 350. For example, in the examples of FIGS. 4 and 5, during subsequent iterations, clusters C6 and C7 may be identified based on clusters C2 and C3 respectively.

Once all clusters have been identified, it may be determined at 370 that there are no additional clusters associated with the current basis vector iteration. Method 270 may then continue at 380 by determining if there are additional basis vectors to identify. In an embodiment, the conditions to determine if there are additional basis vectors may be similar to identifying if it is the last basis vector at 200 or 240 in methods 100 and 220 above. For example, the number of basis vectors may be fixed, or a stability condition may be tested for. If it is determined at 380 that there are additional basis vectors to calculate, method 270 may return to 330, to calculate the subsequent basis vector. If there are no more basis vectors to calculate, however, method 270 may terminate at 390. It may be appreciated that terminating at 390 may be generally similar to terminating at 210 or 260, as discussed above as relating to methods 100 or 220 respectively.

It may be appreciated that in some embodiments, performing the clustering and dimensionality reduction may result in dimensionally reduced data that may be utilized for further analysis without need for decompression. Specifically, the dimensionally reduced data may comprise coefficients that indicate the greatest contribution of the pixel to the scene. Although the dimensionalities of the hyperspectral image data dimensionally reduced hyperspectral image data may vary across embodiments, in one non-limiting embodiment, the hyperspectral image data may include approximately 256 spectral dimensions, while the reduced dimensionality data may include approximately 15 spectral dimensions. It may be appreciated that in other embodiments, while the dimensionally reduced configuration retains the same number of spatial pixels as the original hyperspectral image data, the number of elements in the spectral dimension may be reduced. Additionally, in some embodiments, the dimensionally reduced data may also be treated as a set of vectors (e.g., dimensionally reduced vectors), having an X,Y spatial coordinate, and a set of values associated therewith, indicating the reduced dimensionality data. In various embodiments the hyperspectral image data cube may be received from any appropriate source. Additionally, in some embodiments, a system configured to perform the methods of clustering and dimensionality reduction may be the same system that generates the hyperspectral image data. In other embodiments, the system that generates the hyperspectral image data may be linked to the system that performs the methods of dimensionality reduction and clustering through any appropriate mechanism.

Figure 6:
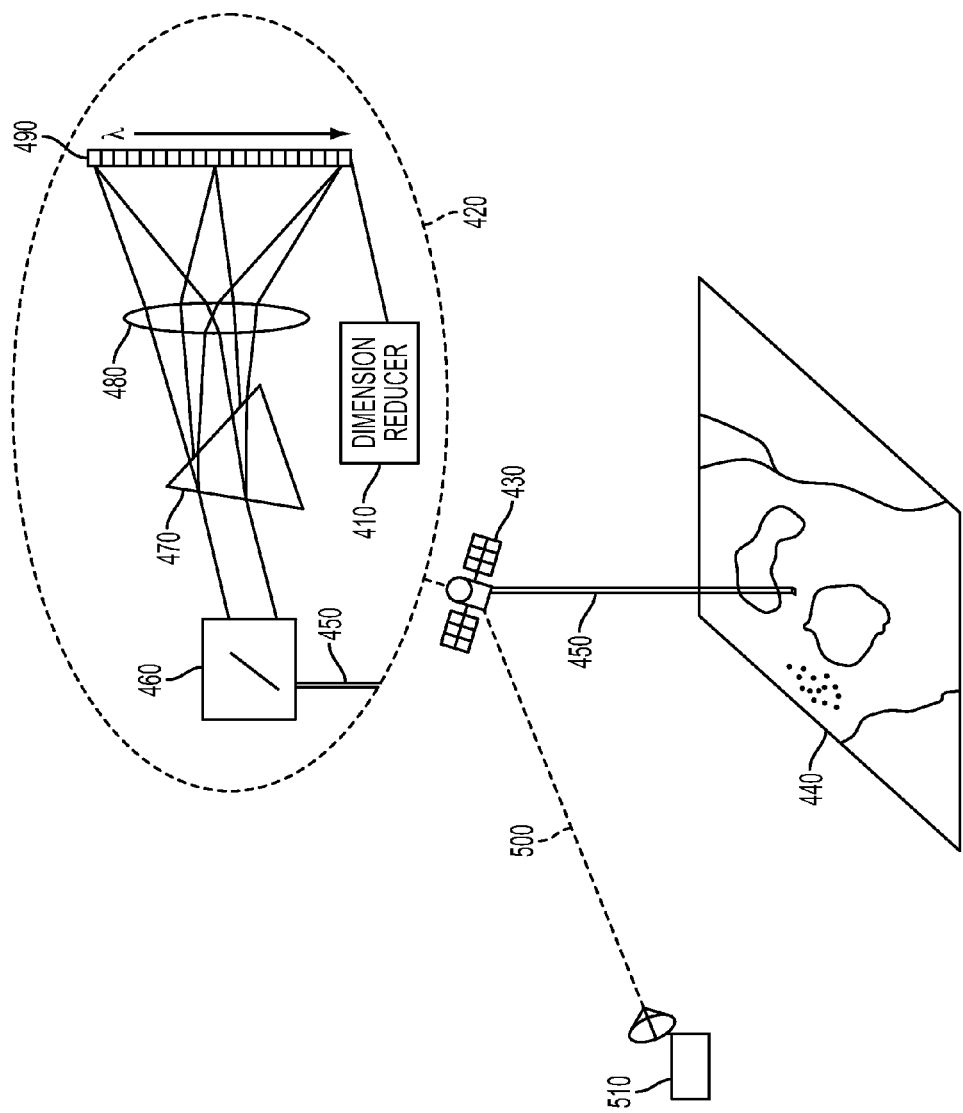
FIG. 6 illustrates an exemplary hyperspectral imaging system having a hyperspectral image dimensionality reduction system associated therewith.

FIG. 6 illustrates an exemplary image dimension reduction system ("IDRS") 410 incorporated as part of a hyperspectral image system 420 provided by a satellite 430. The satellite 430 is tasked to image a geographical area 440, and in so doing receives light 450 from a single ground-resolution cell. To generalize the basic elements provided by a hyperspectral image system 420 and the general method of operation, the light 450 is received by scan mirrors 460 and or other optics that direct the light through at least one dispersing element 470. The dispersing element separates wavelengths and provides them to imaging optics 480 which in turn focus the wavelengths upon an array of detectors 490 arranged to capture data information across a spectrum of wavelengths. The hyperspectral data is then processed by IDRS 410 for transmission 500 to a ground station 510.

Figure 7:
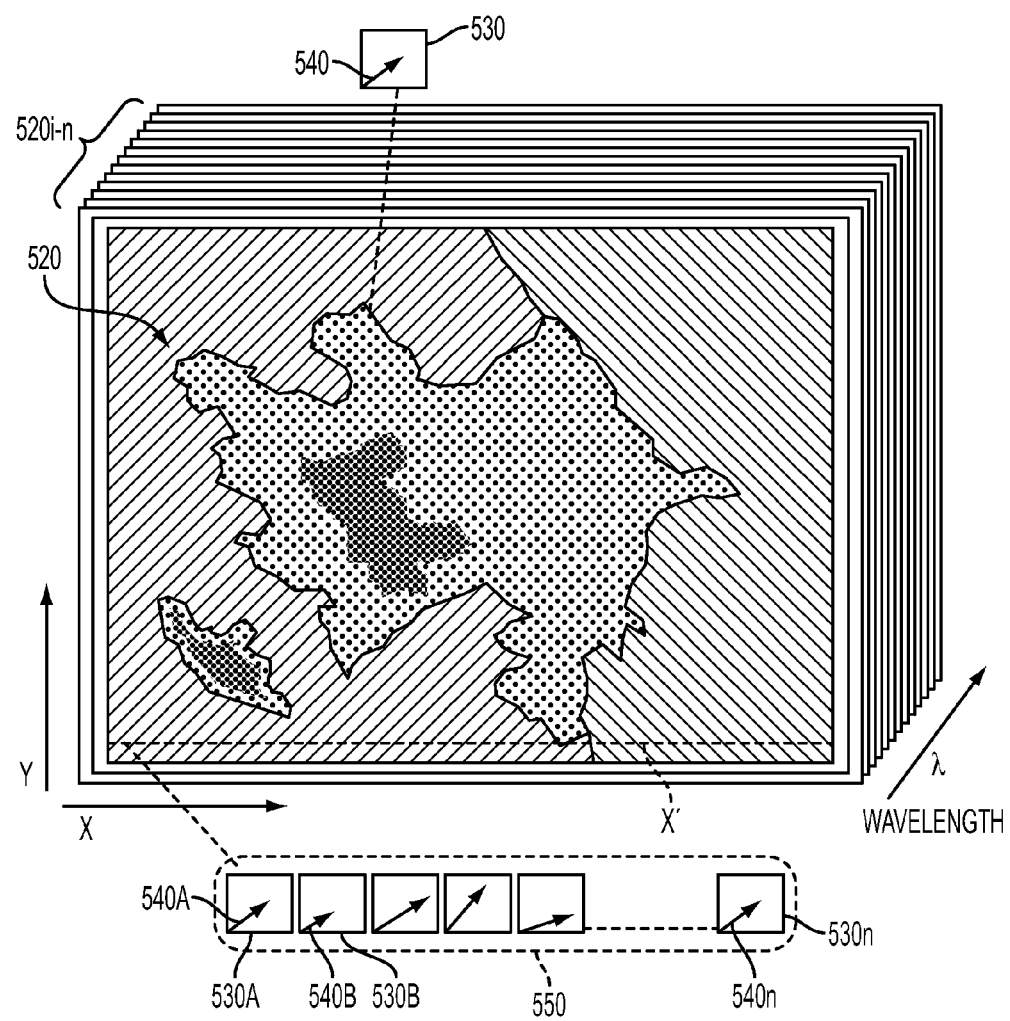
FIG. 7 illustrates an exemplary hyperspectral image which may be processed according to one or more of the methods depicted herein.

While the hyperspectral image data cube created by the hyperspectral image system 420 may vary across embodiments, FIG. 7 illustrates an embodiment of a hyperspectral image 520 (i.e., a hyperspectral image data cube) including constituent images (e.g., images $520i$~$n$) acquired simultaneously in many different adjacent wavelength bands. As indicated, the image is comprised of pixels arranged in an X-Y coordinate system. Under appropriate circumstances, alternative coordinate systems may be employed, however X-Y is represented herein for ease of illustration and discussion, and not by way of limitation. Each pixel 530 of the hyperspectral image 520 has a spectral vector 540. The spectral vector 540 contains at least some number of spectral measurements of the energy upwelling from that pixel. As indicated in an enlarged section 550, of row X' the spectral vector 540A of the initial pixel 530A may well be different from the spectral vectors 540B-540$n$ for pixels 530B-530$n$.

Although various embodiments of the methods of clustering and dimensionality reduction described herein may be implemented on any appropriate system or hardware, in some embodiments, the methods of clustering and dimensionality reduction may be implemented on a computer system, which may generally include typical computer components such as one or more processors, memory modules, storage devices, input and output devices, and so on. In an embodiment, the methods of clustering and dimensionality reduction may be maintained in an active memory of the computer system to enhance speed and efficiency, and may further be coupled to a computer network and utilize distributed resources associated with the computer network. In various embodiments, a system configured to implement the methods of clustering and dimensionality reduction may include one or more interfaces, one or more spectrum readers, and one or more modules that may perform establishing the basis vector set, decomposing the hyperspectral image, and evaluating the hyperspectral image. In some embodiments, the one or more interfaces may be configured to receive data corresponding to one or more hyperspectral images, one or more basis vectors provided by a user, an indication as to whether dimensionality reduction is to be performed as a lossy or lossless operation, tolerance levels for the amount of lost data in the dimensionality reduction, and/or other information relating to the processing and/or analyzing of hyperspectral images. In an embodiment, the one or more interfaces may be arranged to receive information directly from the user via an input device associated with the system, or directly from a component of the system, including, for example, a hyperspectral imager.

According to an embodiment, implementations of the various systems and methods for clustering and reducing dimensionality of hyperspectral images described herein may be made in hardware, firmware, software, or various combinations thereof. For example, the systems and methods for clustering and reducing dimensionality of hyperspectral images may be implemented as computer executable instructions stored on a non-transitory machine readable medium, which may be read and executed using one or more physically separate or communicatively coupled computer systems or other processing devices. The machine readable medium may include various mechanisms for storing and/or transmitting information in a manner readable by the computer systems, the processing devices, or other machines. For example, a machine readable storage medium may include read only memory, random access memory, magnetic disk storage media, optical storage media, flash memory devices, hard drives, cache, removable media, network storage, the internet, the "cloud," another system, or any other appropriate device and/or other media for storing information, and a machine readable transmission media may include signals such as carrier waves, infrared signals, digital signals, and other media for transmitting information. It may be appreciated that receiving or accessing data associated with the methods described herein may be performed at any time and/or in any order. For example, data may be received from storage and loaded into active memory for use as needed, or may be received all at once (e.g., simultaneously, or sequentially at one time). Additionally, although the above disclosure may describe methods, firmware, software, routines, or instructions in terms of specific exemplary aspects and implementations and performing certain actions, it will be apparent that such descriptions are merely for the sake of convenience and that such actions in fact result from the computer systems, the processing devices, processors, controllers, or other devices or machines executing the firmware, software, routines, or instructions.

Figure 8:
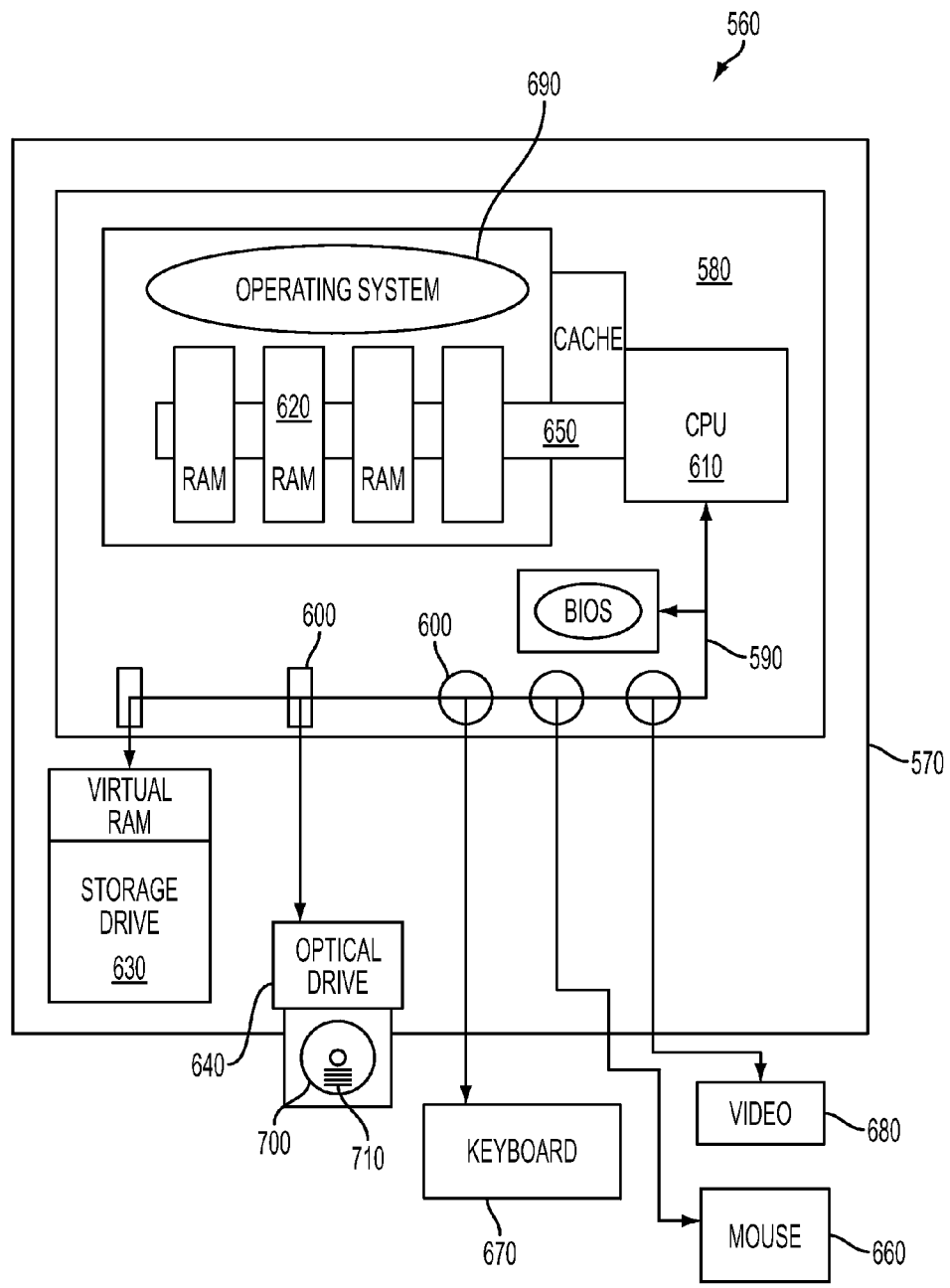
FIG. 8 is a block diagram of a computer system in accordance with one or more embodiments.

FIG. 8 illustrates a high level block diagram of an exemplary computer system 560 which may be used to perform the methods of clustering and dimensionality reduction, and/or similar embodiments. It may be appreciated that in some embodiments, the IDRS 410 may include some or all of the computer system 560. In some embodiments, the computer system 560 may be linked to or otherwise associated with the ground station 510. In an embodiment the computer system 560 has a case 570, enclosing a main board 580. The main board has a system bus 590, connection ports 600, a processing unit, such as Central Processing Unit (CPU) 610, and a data storage device, such as main memory 620, storage drive 630, and optical drive 640. Each of main memory 620, storage drive 630, and optical drive 640 may be of any appropriate construction or configuration. For example, in some embodiments storage drive 630 may comprise a spinning hard disk drive, or may comprise a solid-state drive. Additionally, optical drive 640 may comprise a CD drive, a DVD drive, a Blu-ray drive, or any other appropriate optical medium.

Memory bus 650 couples main memory 620 to CPU 610. A system bus 590 couples storage drive 630, optical drive 640, and connection ports 600 to CPU 610. Multiple input devices may be provided, such as for example a mouse 660 and keyboard 670. Multiple output devices may also be provided, such as for example a video monitor 680 and a printer (not shown). It may be appreciated that the input devices and output devices may alternatively be local to the case 570 and the computer system 560, or may be located remotely (e.g., interfacing with the computer system 560 through a network or other remote connection).

Computer system 560 may be a commercially available system, or may be proprietary design. In some embodiments, the computer system 560 may be a desktop workstation unit, and may be provided by any appropriate computer system provider. In some embodiments, computer system 560 comprise a networked computer system, wherein memory storage components such as storage drive 630, additional CPUs 610 and output devices such as printers are provided by physically separate computer systems commonly tied together in the network. Those skilled in the art will understand and appreciate the physical composition of components and component interconnections comprising computer system 560, and select a computer system 560 suitable for performing the methods disclosed herein.

When computer system 560 is activated, preferably an operating system 690 will load into main memory 620 as part of the boot sequence, and ready the computer system 560 for operation. At the simplest level, and in the most general sense, the tasks of an operating system fall into specific categories—process management, device management (including application and user interface management) and memory management.

In such a computer system 560, the CPU 610 is operable to perform one or more embodiments of the methods described above. Those skilled in the art will understand that a computer-readable medium 700 on which is a computer program 710 for performing the methods (e.g., the methods of clustering and dimensionality reduction 100, 220, and 270) disclosed herein may be provided to the computer system 560. The form of the medium 700 and language of the program 710 are understood to be appropriate for computer system 560. Utilizing the memory stores, such as one or more storage drives 630 and main system memory 620, the operable CPU 610 will read the instructions provided by the computer program 710 and operate to perform the methods of clustering and dimensionality reduction as described above.

It may be appreciated that aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the inventive concept, and the specification and drawings should therefore be regarded as exemplary only, with the scope of the invention determined solely by the appended claims.

What is claimed is:

1. A method of clustering and reducing hyperspectral image data having a plurality of spatial pixels, and a plurality of spectral dimensions associated with each spatial pixel, the method comprising:
computing an initial basis vector associated with the hyperspectral image data;
unmixing the initial basis vector with the hyperspectral image data to generate an initial set of coefficients and an associated set of residual vectors;
generating a set of clusters based on the initial set of coefficients; and
iteratively computing one or more additional basis vectors and updating the set of clusters by:
calculating a subsequent basis vector based on a residual vector associated with a prior unmixing;
unmixing the subsequent basis vector with a prior set of residual vectors to generate additional coefficients associated with each pixel; and
iteratively computing cluster centers and content including an additional dimension associated with the subsequent basis vector.

2. The method of claim 1, wherein said unmixing the initial basis vector with the hyperspectral image data comprises computing a dot product of the initial basis vector with each spatial pixel of the hyperspectral image data, and computing a residual vector associated with each dot product.

3. The method of claim 1 further comprising outputting dimensionally reduced data comprising one or more of the initial set of coefficients and the additional coefficients associated with each pixel.

4. The method of claim 1, further comprising identifying and setting aside outliers identified while iteratively computing one or more additional basis vectors and updating the set of clusters.

5. The method of claim 4, wherein the outliers are identified by dissimilarity from each of the set of clusters.

6. The method of claim 1, wherein the set of clusters based on the initial set of coefficients are equally spaced across the hyperspectral image data.

7. The method of claim 6, wherein there are a user-selected number of the initial clusters.

8. The method of claim 1, wherein iteratively recomputing cluster centers comprises splitting a prior cluster into multiple new clusters.

9. The method of claim 1, wherein iteratively recomputing cluster centers comprises merging two or more prior clusters into a new cluster.

10. The method of claim 1, wherein the initial basis and the subsequent basis vector are orthonormal to each other.

11. The method of claim 1, wherein the subsequent basis vector is computed by normalizing the residual vector associated with a prior unmixing.

12. The method of claim 1, wherein iteratively recomputing cluster centers and content comprises computing average values of the pixels currently assigned to each cluster.

13. The method of claim 1, wherein iteratively recomputing cluster centers and content comprises computing a distance between each pixel of the hyperspectral image data and each cluster center including an additional dimension, and assigning each pixel to a cluster having a closest distance.

14. The method of claim 13, wherein the distance is computed as the Euclidean distance or the Mahalanobis distance.

15. The method of claim 1, wherein iterating cluster assignments and content comprises recomputing cluster centers based on the pixels reassigned to each cluster following the subsequent unmixing.

16. The method of claim 1, wherein said iterating cluster assignments continues for a specified number of iterations.

17. The method of claim 1, wherein changes in the clusters determines when to terminate said iteratively recomputing cluster centers and content.

18. The method of claim 1, further comprising outputting clustered data associated with the hyperspectral image data.

19. The method of claim 18, wherein the clustering data comprises a classification map.

20. The method of claim 1, further comprising determining whether clusters are stable since a prior iteration of iteratively computing one or more additional basis vectors.

21. The method of claim 20, further comprising, when clusters are stable since the prior iteration, terminating without computing a subsequent iteration of iteratively computing one or more additional basis vectors.

22. The method of claim 20, further comprising, when clusters are stable since the prior iteration, computing new basis vectors specific to each cluster.

23. A system configured to cluster and reduce hyperspectral image data having a plurality of spatial pixels, and a plurality of spectral dimensions associated with each spatial pixel, the system comprising:

one or more processors configured to:
compute an initial basis vector associated with the hyperspectral image data;
unmix the initial basis vector with the hyperspectral image data to generate an initial set of coefficients and an associated set of residual vectors;
generate a set of clusters based on the initial set of coefficients; and
iteratively compute one or more additional basis vectors and update the set of clusters by:
calculating a subsequent basis vector based on a residual vector associated with a prior unmixing;
unmixing the subsequent basis vector with a prior set of residual vectors to generate additional coefficients associated with each pixel; and
iteratively computing cluster centers and content including an additional dimension associated with the subsequent basis vector.

24. A method of clustering and reducing hyperspectral image data having a plurality of spatial pixels, and a plurality of spectral dimensions associated with each spatial pixel, the method comprising:
computing an initial basis vector associated with the hyperspectral image data;
unmixing the initial basis vector with the hyperspectral image data to generate an initial set of coefficients and an associated set of residual vectors;
generating histograms of the initial set of coefficients to determine a number of pixels having a value within a given range of a value of the coefficient
generating a set of clusters based on the histograms of the initial set of coefficients; and
iteratively computing one or more additional basis vectors and updating the set of clusters by:
calculating a subsequent basis vector based on a residual vector associated with a prior unmixing;
unmixing the subsequent basis vector with a prior set of residual vectors to generate additional coefficients associated with each pixel; and
iteratively generating histograms of the additional coefficients associated with the subsequent basis vector to identify new clusters.

25. The method of claim 24 wherein generating the set of clusters comprises identifying local minimums in the histograms of the initial set of coefficients, and calculating a center of a cluster based on pixels positioned between the local minimums.

26. The method of claim 24 wherein iteratively generating histograms of the additional coefficients comprises identifying new local minimums in histograms of the additional coefficients, and splitting the cluster at the local minimums.

* * * * *